UNITED STATES PATENT OFFICE.

GEORGE DAWSON, OF CRESCENT, LOUISIANA.

TEMPERING COMPOUND.

946,838.  Specification of Letters Patent.  Patented Jan. 18, 1910.

No Drawing.  Application filed August 17, 1909.  Serial No. 513,339.

*To all whom it may concern:*

Be it known that I, GEORGE DAWSON, a citizen of the United States, residing at Crescent, in the parish of Iberville and State of Louisiana, have invented a new and useful Composition of Matter to be Used for Tempering Band-Saw Brazes, of which the following is a specification.

My composition consists of the following ingredients, combined in the proportions stated, viz: slaked lime 8 parts, lamp black 2 parts. These ingredients are to be thoroughly mingled by agitation.

In using the above named composition the saw must be placed in the brazing clamps and the solder put between the laps. Heat the brazing irons sufficiently to melt the solder then apply the irons to the braze. After the irons are screwed down on the braze apply my tempering compound to the thickness of $\frac{3}{8}$ of an inch on either side of the brazing irons on the upper side of the saw, as far back of the irons as the saw heats. When the irons become cool enough to remove from the braze take them off, apply my tempering compound to the upper side of the braze and let stand until the braze becomes cold. This will equalize the temper in the braze with that in the body of the saw. Slaked lime and lamp black draw the temper back into the steel after the hot irons have taken it out and cause the braze to hold tension equal to the rest of the saw.

I claim:

1. The herein-described composition of matter, consisting of slaked-lime and lamp-black, substantially as described and for the purpose specified.

2. The herein-described composition of matter, for tempering band-saw brazes, consisting of slaked-lime eight parts, lamp-black two parts, substantially as described.

GEORGE DAWSON.

Witnesses:
 ED MIREMONT, Jr.,
 A. JOLY, Jr.